United States Patent [19]
Shellhause

[11] 3,913,327
[45] Oct. 21, 1975

[54] FLOW SENSITIVE VALVE MECHANISM
[75] Inventor: Ronald L. Shellhause, Vandalia, Ohio
[73] Assignee: General Motors Corporation, Detroit, Mich.
[22] Filed: Oct. 21, 1974
[21] Appl. No.: 516,672

Related U.S. Application Data
[60] Continuation-in-part of Ser. No. 478,686, June 12, 1974, abandoned, which is a division of Ser. No. 391,216, Aug. 24, 1973, abandoned.

[52] U.S. Cl. .................... 60/585; 137/118; 137/494
[51] Int. Cl.² ......................................... B60T 11/22
[58] Field of Search ........... 137/499, 102, 115, 118, 137/533.11, 494; 60/585

[56] References Cited
UNITED STATES PATENTS

| | | | |
|---|---|---|---|
| 1,759,798 | 5/1930 | Murphy et al. | 137/533.11 X |
| 2,169,541 | 8/1939 | Smith | 137/499 X |
| 2,283,695 | 5/1942 | Pratt et al. | 60/585 |

*Primary Examiner*—William R. Cline
*Attorney, Agent, or Firm*—D. D. McGraw

[57] ABSTRACT

A fluid flow sensitive valve is positioned in a valve chamber between a pressurizing chamber and an outlet port. A compensation port leading to a fluid reservoir is also connected to the valve chamber. The valve is moved to close the compensation port when fluid is flowing through the valve chamber from the pressurizing chamber to the outlet, and to open the compensation port when fluid is returning from the outlet to the pressurizing chamber. The valve is illustrated as being embodied in a master cylinder.

4 Claims, 8 Drawing Figures

FLOW SENSITIVE VALVE MECHANISM

This is a Continuation-in-Part of U.S. Application Ser. No. 478,686, filed June 12, 1974, and entitled "Flow Sensitive Valve Mechanism," now abandoned which was a division of United States Application Ser. No. 391,216, filed Aug. 24, 1973, and entitled "Master Cylinder Valve Mechanism," now abandoned.

The invention relates to flow sensitive valves and more particularly to compensation port-controlling valve mechanisms adapted for use in master cylinder assemblies and sensitive to the flow of fluid to and from brakes and pressurizing chambers. In each embodiment disclosed, the valve mechanism is positioned in a valve chamber connected to a valve seat formed at the end of the compensation port communicating with a fluid reservoir. The chamber containing the valve is connected to the master cylinder pressurizing chamber through a first port and to a conduit leading to the brakes by a second port. The valve member has flow sensitive fins angularly positioned in the flow path of fluid flowing through the first and second ports. When fluid flows from the pressurizing chamber to the brakes the valve is moved to close the valve seat and therefore prevent pressurizing fluid from entering the reservoir. Upon brake release, fluid passes from the second port to the pressurizing chamber as the pressurizing chamber increases in volume. The fluid acts on the flow sensitive fins to move the valve member to open the valve seat so that fluid can also flow into the reservoir. If the pressurizing chamber volume increases at a faster rate than fluid can flow into the second port, fluid from the reservoir flows through the compensation port anad into the pressurizing chamber to prevent a partial vacuum being imposed on the brake conduit system. The valve member at all times permits fluid flow between the first and second ports, the flow path passing primarily either above or below the flow sensitive fins.

IN THE DRAWINGS

Figure 1:
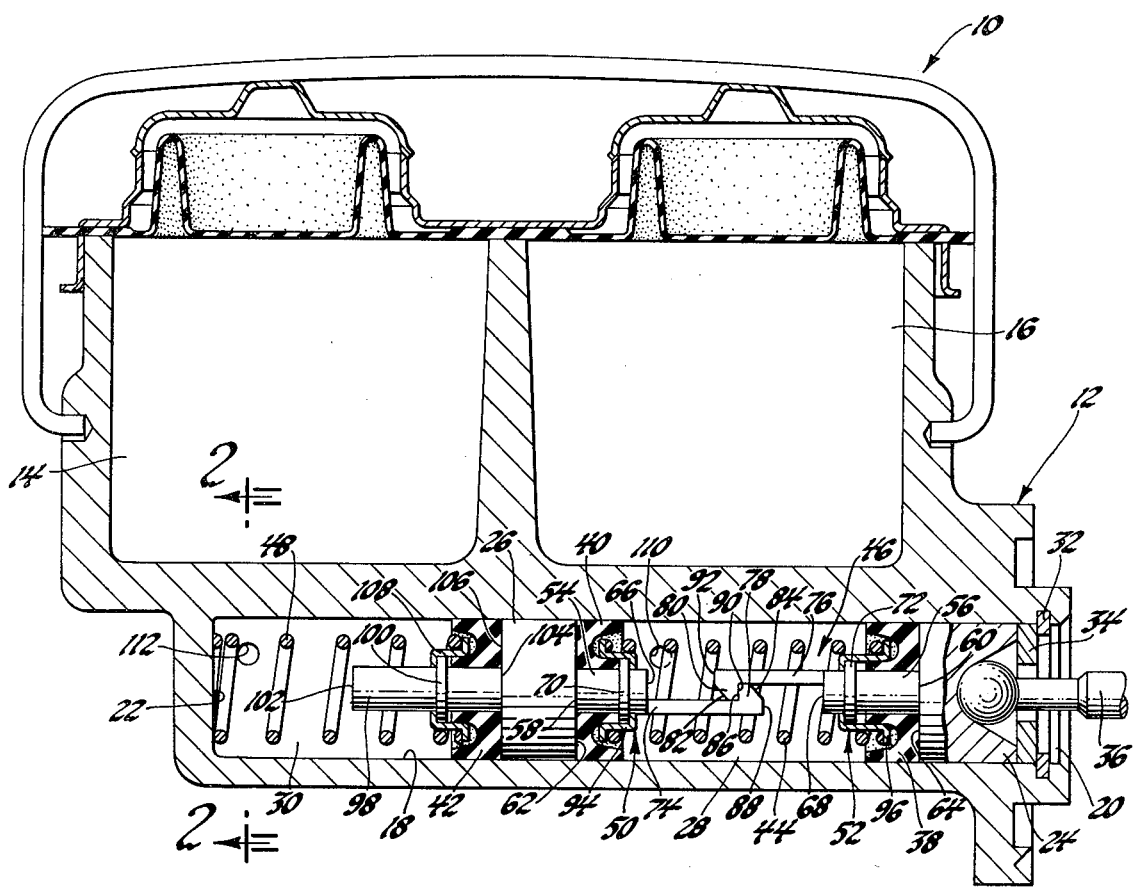
FIG. 1 is a cross-section view with parts broken away and showing a master cylinder assembly embodying the invention.

The master cylinder assembly 10 has a housing 12 formed to provide reservoir chambers 14 and 16 and a bore 18. The bore has an open end 20 and a closed end 22. Primary pressurizing piston 24 and secondary pressurizing piston 26 are reciprocably received in bore 18. A primary pressurizing chamber 28 is defined by the bore and the pistons 24 and 26. A secondary pressurizing chamber 30 is defined by the secondary piston 26 and the portion of bore 18 adjacent the bore end 22. A piston stop 32 in the open end 20 of the bore cooperates with a washer 34 against which the rear end of the primary piston may rest to provide a piston stop arrangement which positions the pistons when the brakes are released. Push rod 36 extends through stop 32 and washer 34 and is connected with piston 24 so that movement of the push rod in one direction will actuate the master cylinder to pressurize fluid in the pressurizing chambers 28 and 30. Primary cup or seal 38 is positioned on the forward face of piston 24. Secondary cups or seals 40 and 42 are positioned on either side of piston 26. A piston return spring 44 is positioned in the primary pressurizing chamber 28 and operatively acts on pistons 24 and 26 through a spring caging mechanism 46. A secondary piston return spring 48 is located in secondary pressurizing chamber 30 and operatively engages the bore end 22 and the secondary piston 26. Both piston return springs are preferably preloaded in compression when the pistons are in the brake release position shown in FIG. 1, with the primary piston return spring 44 having the greater preload. Thus when the master cylinder is in the brake release position the caging mechanism 46 establishes the precise distance that the pistons 24 and 26 are spaced apart by the spring 44, spring 48 urging the secondary piston 26 to this position.

The caging mechanism 46 includes two substantially identically constructed caging members 50 and 52. These members have body sections 54 and 56, respectively, which are positioned axially with spring 44, pistons 24 and 26, and bore 18. The body sections have outer abuttable end surfaces 58 and 60, respectively, which normally abut the adjacent faces 62 and 64 of secondary piston 26 and primary piston 24, respectively. The body surfaces have intermediate abuttable surfaces 66 and 68 and flanges 70 and 72, respectively, the flanges being positioned intermediate the abuttable end surfaces of each body section. The portion of each body section between each flange and its outer end surface is received through the annular cup or seal associated therewith. Thus body section 54 is received through secondary cup 40 and body section 56 is received through primary cup 38. The caging members 50 and 52 are respectively provided with caging arms 74 and 76 which extend axially parallel to the axes of the body sections, but are laterally spaced therefrom. These arms are springy for ease of installation as described below. The arms respectively terminate in hook-ends 78 and 80 which extend laterally to intersect the axes of the body sections. The hook-ends respectively have beveled outer surfaces 82 and 84 and axially spaced abuttable end surfaces 86, 88 and 90, 92. These end surfaces are parallel to the abuttable intermediate surfaces 66 and 68 of the body sections. Spring seats and retainers 94 and 96 are respectively received about the body sections 54 and 56 so that they engage flanges 70 and 72 on the sides thereof adjacent the surfaces 67 and 68. The spring seats and retainers are constructed to receive the opposite ends of spring 44.

A similar spring seating and retaining arrangement is provided in secondary spring 48 in chamber 30. In this instance a plug 98 is constructed similar to the body section of one of the caging members, the plug having a flange 100 positioned between abuttable end surfaces 102 and 104. The plug extends through the secondary cup 32 so that its end surface 104 abuts the face 106 of piston 26. The portion of plug 98 extending from flange 100 toward bore end 22 is of a length to permit the plug end surface 102 to engage the bore end 22 upon sufficient movement of piston 26 in the bore. The spring seat and retainer 108 is received on plug 98 and engages flange 100 and one end of secondary spring 48. Thus the spring 48 acts on piston 26 through the seat and retainer 108 and plug 98.

Ports 110 and 112 are provided through the housing to communicate with the pressurizing chambers 28 and 30, respectively. These ports lead to compensating port controlling valve members and the conduits of the brake circuits.

Figure 2:
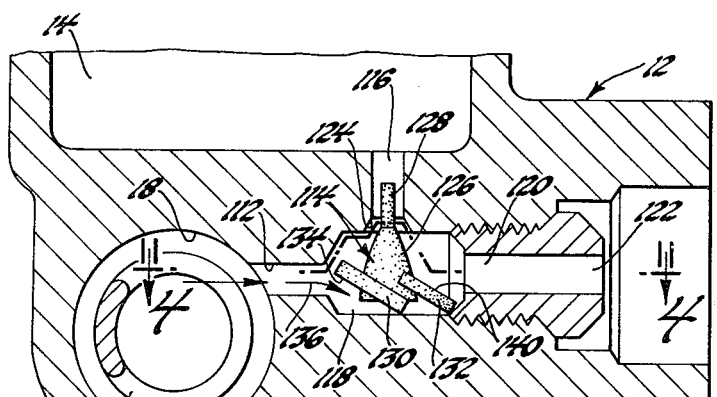
FIG. 2 is a cross-section view taken in the direction of arrows 2—2 of FIG. 1 and showing the valve assembly in one position.
Figure 4:
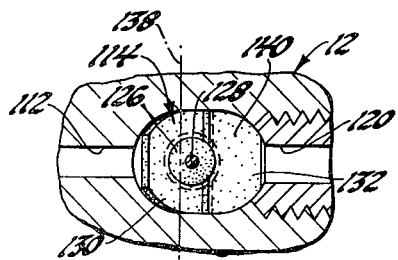
FIG. 4 is a fragmentary cross-section view taken in the direction of arrows 4—4 of FIG. 2 and showing the valve member.
Figure 3:
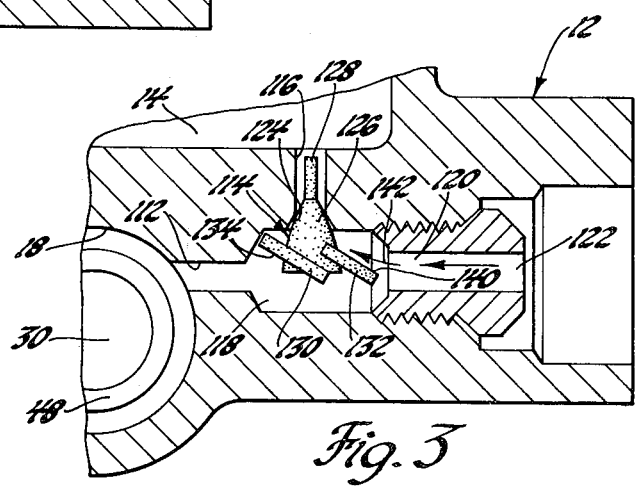
FIG. 3 is similar to FIG. 2 and shows the valve assembly in another position.
Figure 5:
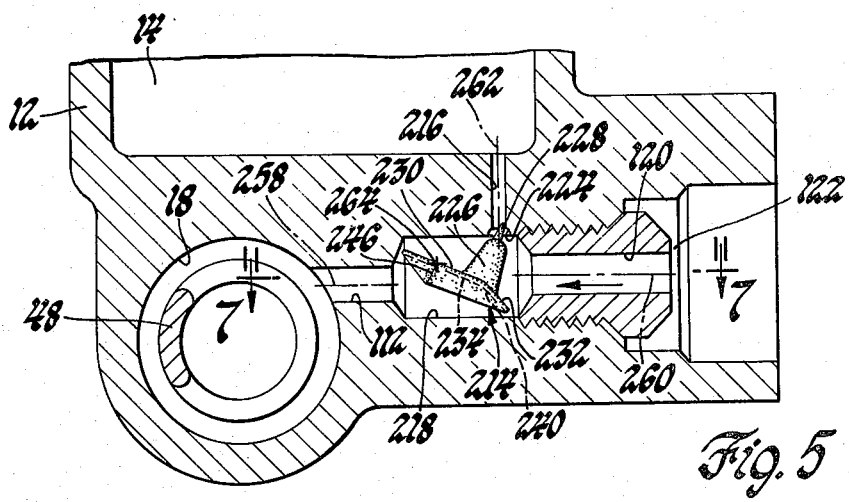
FIG. 5 is a cross-section view similar to FIG. 2 and showing a modified valve assembly in one position.
Figure 6:
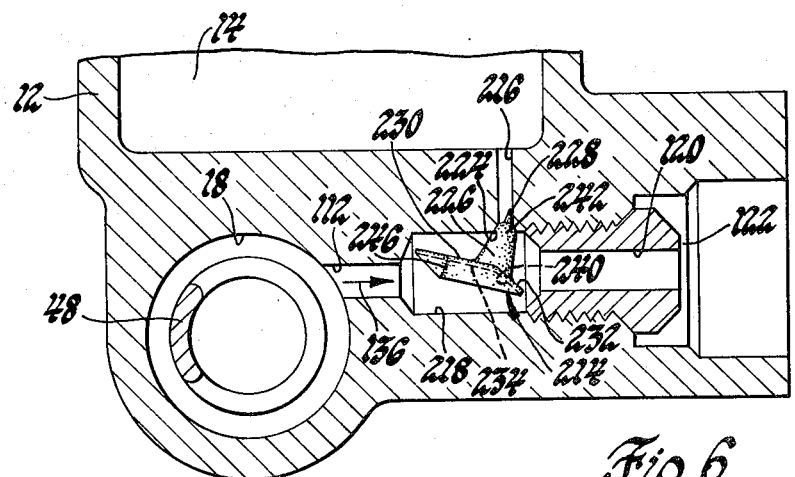
FIG. 6 is similar to FIG. 5 and shows the modified valve assembly in another position.
Figure 7:
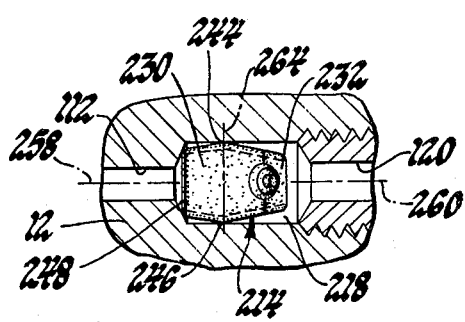
FIG. 7 is a fragmentary cross-section view taken in the direction of arrows 7—7 of FIG. 5 and showing the modified valve member.
Figure 8:
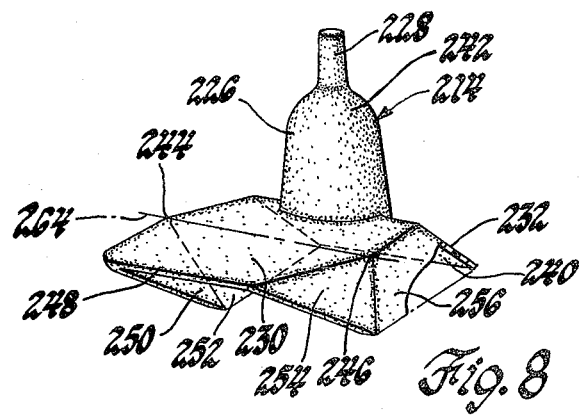
FIG. 8 is an isometric view of the modified valve member of FIGS. 5–7.

During initial installation of the pistons and springs, the secondary piston, together with its cups 40 and 42, plug 98, retainer 108, and spring 106, may be inserted in the bore, and caging member 50 and retainer 94 positioned relative to the piston 26 and cup 40. Spring 44 may be then placed in the bore so that it seats on spring seat and retainer 94. The caging member 52, the spring seat and retainer 96, the cup 38, and piston 24 are then inserted in the bore with the end of spring 44 being guided toward the seat and retainer 96. As the last inserted elements are moved forward in the bore, beveled surface 82 of arm 76 engages beveled surface 84 of arm 74 in camming relation, causing the arms to flex in spring-like cantilever fashion so that the hooked-end 78 passes over the hooked-end 80 and these ends snap together into the position in FIG. 1. The preload on spring 44 maintained by this position holds the hook-end surfaces 86 and 90 in abutting engagement so that the hook-ends prevent the caging members from moving axially apart. This establishes the precise distance between the abutting surfaces 58 and 60 of the two caging members. Pistons 26 and 24 are respectively engaged with these surfaces due to the preload on spring 48 and the abuttable engagement of piston 24 with washer 34, which in turn is in engagement with stop 32, and are therefore precisely positioned. When the master cylinder is actuated to pressurize fluid in chambers 28 and 30, piston 24 and cup 38 move toward bore end 22, moving caging member 52 and spring seat and retainer 96 with it. This tends to compress spring 44 while at the same time generating a pressure in chamber 28. Both forces act on piston 26 through cup 40 and spring seat and retainer 94 and caging member 50 to move piston 26 toward bore end 22. This causes pressurization of fluid in chamber 30 and spring 48 is compressed. The pressurized fluid in each chamber flows out of ports 110 and 112, respectively, toward the brakes being actuated. There is a valve member 114 which controls the compensation port from each of the reservoirs 14 and 16, only the valve associated with the compensation port 116 of reservoir 14 being illustrated in FIGS. 2, 3 and 4. Port 112 extends laterally from chamber 30 and opens into valve chamber 118, which is formed in housing 12. Another port 120 communicates chamber 118 with the outlet 122 which is suitably connected to a brake conduit leading to a set of brakes. Ports 112 and 120 are in fluid flow alignment and may be considered to be an outlet passage in which chamber 118 is formed. Compensation port 116 extends from reservoir 14 to chamber 118 through a valve seat 124 formed at the pont where port 116 opens into chamber 118.

the valve member 114 has a valve body 126 which is arranged to cooperate with valve seat 124 to open or close the valve seat, depending upon the position of the valve body. A guide pin 128 extends from valve body 126 through seat 124 and into the lower portion of compensation port 116 so as to maintain the valve in lateral position relative to valve seat 124. Fluid flow sensitive fins 130 and 132 extend from valve body 126 at an acute angle relative to the flow path of fluid passing through ports 112 and 120. Fin 130 is adjacent but separated from port 112, and fin 132 is adjacent but separated from port 120. Fin 130 has a fluid impingement surface 134 on the under side thereof and so positioned relative to port 112 that fluid which flows from port 112 into chamber 118, indicated by arrow 136, acts on surface 134 to move the valve member upwardly so that valve body 126 closes valve seat 124. Fluid then flowing from port 112 through chamber 118 to port 120 passes underneath valve member 114 while maintaining the valve in the position shown in FIG. 3. Fin 130 engages the side walls of chamber 118 along the pivot axis 138, as seen in FIG. 4, so that the valve tends to remain in whatever position it has been forced by fluid flow forces.

Fin 132 has an impingement surface 140 adjacent the point where port 120 opens into chamber 118, surface 140 being on the upper side of fin 132. When the brakes are released, the push rod 36 moves rightwardly as seen in FIG. 1 and the pressures in chambers 28 and 30, together with the compression forces of springs 44 and 48, move pistons 24 and 26 rightwardly as seen in FIG. 1. This increases the volume of each pressurizing chamber. At the same time, the pressure in the brake conduit connected with port 120 causes fluid flow to occur from port 120 into chamber 118. This flow, indicated by arrow 42, acts on surface 140 to move the valve 114 downwardly from the position seen in FIG. 3 to the position seen in FIG. 4, opening compensation port 116. Thus fluid being returned from the brakes passes into chamber 30 and may also pass into reservoir 14. In some instances, the pistons 24 and 26 may move toward the brake release position to increase the volumes of chambers 28 and 30 at a faster rate than fluid can be supplied from the brakes through the brake conduits. This can cause a partial vacuum to occur in the system unless compensating fluid is provided. Since compensating port 116 has been opened by the initial fluid flow indicated by arrow 142, fluid from reservoir 14 can enter chamber 118 through compensation port 116 and then pass through port 112 and into chamber 30 to provide for such compensation.

In the modification illustrated in FIGS. 5-8, the same reference characters utilized in describing the master cylinder assembly of FIGS. 1-4 are used, with modified elements, portions, members, etc. having different reference characters. The valve member 214, located in valve chamber 218, has a valve body 226 which is arranged to cooperate with valve seat 224 to open or close the valve seat, depending upon the position of the valve body. A guide pin 228 extends from valve body 226 through seat 224 and into the lower portion of compensation port 216 so as to maintain the valve in lateral position relative to valve seat 224. Fluid flow sensitive platform 230 and deflector fin 232 extend from valve body 226 at acute angles relative to the flow path of fluid passing through ports 112 and 120. Platform 230 is adjacent but separated from port 112, and fin 232 is adjacent but separated from port 120. Platform 230 has a fluid impingement surface 234 on the under side thereof, and an extended portion of surface 234 becomes fluid impingement surface 240 on the under side of fin 232. Surfaces 234 and 240 are so positioned relative to port 112 that fluid which flows from port 112 into chamber 218, indicated by arrow 136, acts on surfaces 234 and 240 to pivot the valve body 226 upwardly so that the spherical section 242 of valve body 226 closes valve seat 224. Pivot points 244 and 246 are provided on the sides of platform 230 and longitudinally intermediate the valve body 226 and the platform edge 248 which is adjacent port 112. The pivot points are also the junctions of the platform 230 and side sections 250, 252 and 254, 256. It can be seen that the inner surfaces of the side sections and surfaces 234 and 240 from a channel-like flow path under the valve member which receives fluid from port 112 when the fluid flows to port 120. When the direction of fluid flow is from port 120 into chamber 218, the upper surfaces of deflector fin 232 and platform 230 are subjected to fluid impingement which pivots the valve member so that port 216 is opened.

The valve member 214 is made of a suitable material which has a specific gravity slightly greater than the specific gravity of the fluid used so that the assembly is self-bleeding. When there is no fluid flow through chamber 218 and no greater fluid pressure in chamber 218 than the fluid pressure in reservoir 14, the valve member will either remain open or pivot by gravity to the open position shown in FIG. 5. A suitable material is a form of Nylon, a trademark for polyamides, which is also sufficiently flexible, particularly in the platform, fin and side section portions, to permit easy assembly of the valve member into chamber 218 before the fitting through which port 120 is formed is installed. By providing a spherical seat 224 and a spherical valve section 242, valve tolerances are less critical than with some other poppet-like valves.

The relationship of the axis 258 of port 112 and axis 260 of port 120 with the axis 262 of port 116 or port 216 is that they are substantially perpendicular to each other. The pivot axis 264 of valve member 214, which lies along a line joining pivots 244 and 246, is substantially perpendicular to the axes 258 and 260 as well as axis 262. It does not intersect any of these other axes, however, being slightly above axes 258 and 260, and laterally spaced from axis 262. Therefore it is also skew to these axes. Axis 258 may be aligned with axis 260 to provide a common axis, or these axes may be slightly offset but parallel as illustrated, but nevertheless described as being generally axially aligned. These axial relationships permit the impingement-generated forces and the force of gravity to act in the manners described above to properly position the valve under various conditions of operation.

What is claimed is:

1. A fluid flow sensitive valve assembly comprising:
a housing having a valve chamber formed therein and first and second and third inlet-outlet ports communicating with said chamber,
said first and second ports being generally axially aligned and on opposite sides of said chamber, said third port having a valve seat at said chamber, said chamber having side walls and being generally oblong in the direction of flow between said first and second ports;
a movable valve in said chamber having a valve body engageable with said valve seat, a guide pin on said valve body extending through said valve seat and into said third port, and fin means extending from aid valve body and toward said first and second ports at acute angles to the port axes so as to present a first angularly disposed surface to said first port and a second angularly disposed surface to said second port, said fin means having a pivot axis extending transversely of the direction of flow between said first and second ports, said fin means engaging said chamber side walls along said axis for pivotal and sliding support, said pivot axis being displaced toward said first port relative to said guide pin;
whereby fluid flowing into said chamber from said first port impinges on said first angularly disposed surface and flows out through said second port to move said valve body to close said valve seat and said third port, and fluid flowing into said chamber from said second port impinges on said second angularly disposed surface and flows out through said first port to move said valve body to open said valve seat and said third port and also thereafter flows out through said third port.

2. A compensation port control valve for selectively controlling fluid communication of a fluid reservoir with a pressurizing chamber and a pressurizing chamber outlet port in accordance with the direction of fluid flow between the pressurizing chamber and the outlet port, said valve comprising:
a valve housing having a flow path including a valve chamber formed therein having an outlet adapted to be fluid connected to a pressurizing chamber outlet port, a compensation port communicating with said valve chamber and having a valve seat through which said compensation port opens, said compensation port adapted to be connected to a fluid reservoir, and a pressure fluid inlet port in said flow path and communicating with said valve chamber and adapted to be connected to a fluid pressurizing chamber;
a valve member movably contained in said valve chamber in flow oriented relation for pivotal movement about an axis transverse to said flow path and for translatable movement toward and away from impingement valve seat and having a valve body extending into and selectively matable with said valve seat to selectively open and close said valve housing compensation port, said valve member having a plurality of flow-impingeable surfaces on said valve body positioned in acute angular relation to the portion of said flow path at said valve chamber outlet so that fluid flowing from said pressure fluid inlet port through said flow path to said valve chamber outlet impinge on at least one of said surfaces and moves said valve body by fluid impingement reaction to close said valve body against said valve seat and thereby close said compensation port, and fluid flowing in reverse by returning along said flow path through said outlet and into said valve chamber impinging on at least one of said surfaces and moving said valve body by fluid impingment reaction to open said valve seat and thereby open said compensation port whereby fluid communication between said compensation port and said valve chamber is established to provide fluid compensation.

3. A fluid flow sensitive valve assembly comprising:

a housing having a valve chamber formed therein and first and second and third inlet-outlet ports communicating with said chamber, said first and second ports being generally axially aligned and on opposite sides of said chamber, said third port having a spherical section valve seat at said chamber;

a movable valve in said chamber having a valve body formed with a spherical section valve element engageable with said valve seat, a guide pin on said valve body extending through said valve seat and into said third port, and fluid impingement surface means extending from said valve body and toward said first and second ports at acute angles to the first and second port axes so as to present a first angularly disposed surface to said first port and a second angularly disposed surface to said second port, said first angularly disposed surface having pivot points provided on either side thereof between said valve body and said first port and engaging the sides of said chamber on a pivot axis which is skew and substantially perpendicular to the first, second and third port axes, the axis of said third port being substantially perpendicular to the axes of said first and second ports, whereby fluid flowing into said chamber from said first port impinges on said first and second angularly disposed surface and flows out through said second port to pivot said valve on said pivot axis to move said valve body valve element to close said valve seat and said third port, and fluid flowing into said chamber from said second port impinges on said second and first angularly disposed surface, and flows out through said first port to pivot said valve on said pivot axis to move said valve body element to open said valve seat and said third port and also thereafter flows out of said chamber through said third port, said movable valve having a specific gravity greater than the fluid in said chamber whereby, when there is no fluid flow in said chamber and the fluid pressure in said third port is no less than the fluid pressure in said chamber, said valve remains open or if closed tends to pivot open under gravity to keep said third port open under such conditions.

4. In a master cylinder assembly having a housing with a fluid pressurization chamber formed therein and having side walls of effective length different from the chamber end walls, a fluid reservoir containing a fluid supply for said chamber, port means continuously communicating with said chamber and adapted to be connected to a fluid circuit to be pressurized upon actuation of said master cylinder assembly and to be unpressurized upon release of said master cylinder assembly, said port means having a compensation valve chamber formed therein, and a port communicating said reservoir and said valve chamber and terminating in said valve chamber with a valve seat, the improvement comprising a flow responsive valve positioned in said valve chamber in pivotal and slidably movable engagement with said chamber side walls and having fluid flow-impinging surfaces thereon acted upon by fluid flow through said port means to pivotally and slidably move said valve to close said valve member against said valve seat when that fluid flow is from said pressurization chamber and to open said valve member from said valve seat when that fluid flow is toward said pressurization chamber, said valve and said valve seat being spherical sections to provide self-centering, said valve having a greater specific gravity than the fluid and acting under the influence of gravity to open said valve relative to said valve seat when there is no fluid flow in said port means and the fluid pressure in said valve chamber is no greater than the fluid pressure in said reservoir.

* * * * *

UNITED STATES PATENT AND TRADEMARK OFFICE
CERTIFICATE OF CORRECTION

PATENT NO. : 3,913,327
DATED : October 21, 1975
INVENTOR(S) : Ronald L. Shellhause It is certified that error appears in the above-identified patent and that said Letters Patent are hereby corrected as shown below:

```
Column 1, line 33, "anad" should be -- and --.
Column 4, line 1,  "the" should be -- The --.
Column 5, line 17, "from" should be -- form --.
Column 6, claim 1, line 5, "aid" should be -- said --;
          claim 2, line 48, delete "impingement" and insert
                                therefor -- said --.
```

*Signed and Sealed this*

*second* Day of *March 1976*

[SEAL]

Attest:

RUTH C. MASON
*Attesting Officer*

C. MARSHALL DANN
*Commissioner of Patents and Trademarks*